United States Patent
Huang et al.

(10) Patent No.: US 11,174,363 B2
(45) Date of Patent: *Nov. 16, 2021

(54) METHOD OF PREPARING THERMOPLASTIC POLYURETHANE MEMBRANE WITH HIGH ADHESION AND HIGH ELASTICITY

(71) Applicant: Taiwan Textile Federation, R.O.C., Taipei (TW)

(72) Inventors: Shu-Hui Huang, Taipei (TW); Sheng-Jen Lin, Taipei (TW); Yao-Hung Kuo, Taipei (TW); Jian-Fan Chen, Taipei (TW); Hung-Kung Chien, Taipei (TW); Yu-chuan Lin, Taipei (TW); Yun-chin Kuo, Taipei (TW)

(73) Assignee: TAIWAN TEXTILE FEDERATION, R.O.C., Taipei (TW)

( * ) Notice: Subject to any disclaimer, the term of this patent is extended or adjusted under 35 U.S.C. 154(b) by 171 days.

This patent is subject to a terminal disclaimer.

(21) Appl. No.: 16/442,532

(22) Filed: Jun. 16, 2019

(65) Prior Publication Data
US 2020/0332079 A1 Oct. 22, 2020

(30) Foreign Application Priority Data
Apr. 19, 2019 (TW) ................. 108113781

(51) Int. Cl.
B05D 5/00 (2006.01)
C08J 7/12 (2006.01)
C09J 7/38 (2018.01)
B05D 5/10 (2006.01)

(52) U.S. Cl.
CPC .................. C08J 7/12 (2013.01); B05D 5/00 (2013.01); B05D 5/10 (2013.01); C09J 7/38 (2018.01); B05D 2503/00 (2013.01); C08J 2375/04 (2013.01); C09J 2475/00 (2013.01)

(58) Field of Classification Search
CPC ......... B05D 5/10; B05D 5/00; B05D 2503/00
See application file for complete search history.

(56) References Cited

U.S. PATENT DOCUMENTS 4,363,686 A * 12/1982 Komarek .............. B29C 43/222
156/242
2006/0054053 A1* 3/2006 Masutani ............. C09D 183/10
106/2

* cited by examiner

Primary Examiner — Hai Y Zhang
(74) Attorney, Agent, or Firm — Chun-Ming Shih; HDLS IPR Services

(57) ABSTRACT

A method of preparing a thermoplastic polyurethane membrane with high adhesion and high elasticity includes the following steps: (a) preparing a modifying solution, wherein the modifying solution is one or a mixture of at least two of diethylenetriamine, diethylaminopropylamine, and diaminodiphenylmethane; (b) preparing a semi-finished product by applying the modifying solution on at least one surface of a thermoplastic polyurethane membrane; and (c) subjecting the semi-finished product to a temperature of 50° C.~180° C. in order for the semi-finished product to undergo a reaction and thus form the thermoplastic polyurethane membrane with high adhesion and high elasticity.

9 Claims, 4 Drawing Sheets

Strain (displacement) by stretching (%)

METHOD OF PREPARING THERMOPLASTIC POLYURETHANE MEMBRANE WITH HIGH ADHESION AND HIGH ELASTICITY

BACKGROUND OF THE INVENTION

Technical Field

The present invention relates to a method of preparing a thermoplastic polyurethane membrane with high adhesion and high elasticity. More particularly, the invention relates to a method that applies surface modification to the preparation of a thermoplastic polyurethane membrane in order to enhance the adhesion and elasticity of the resulting membrane.

Description of Related Art

Thermoplastic polyurethane (TPU) is an elastomer in extensive use in the textile fabric industry, shoe material industry, and apparel industry. Generally, TPU is formed as a pressure-sensitive adhesive (PSA) membrane to enable adhesive attachment of, for example, a trademark label or decoration to a textile, clothing fabric, or shoe material by a high-frequency bonding technique.

The bond between a conventional TPU membrane and a fabric (or fibers thereof), however, is temporary adhesion at high temperature around 100~200° C. and cannot be adhered at room temperature, which typically consists in the adhesion between the polymer chains of polyurethane (PU) and a diisocyanate compound, without any other adhesive bonding mechanism involved, and this is why a conventional TPU membrane cannot completely cover the fibers it is attached to. If, therefore, an article is adhered to a textile solely by a conventional TPU membrane, it can be expected that the article may peel off easily due to the membrane's inadequate adhesion and low elasticity.

The issue to be addressed by the present invention is to design a method for preparing a TPU membrane with high adhesion and high elasticity, or more particularly for modifying the surface(s) of a TPU membrane with a compound in order to provide the membrane with higher adhesion and higher elasticity than in the prior art.

BRIEF SUMMARY OF THE INVENTION

To solve the aforesaid problem of the prior art, the present invention provides a method of preparing a TPU membrane with high adhesion and high elasticity. The method includes the steps of: preparing a modifying solution, wherein the modifying solution is one or a mixture of at least two of diethylenetriamine, diethylaminopropylamine, and diaminodiphenylmethane; preparing a semi-finished product by applying the modifying solution on at least one surface of a TPU membrane, wherein the weight ratio of the modifying solution to the TPU membrane is 0.1%~10%; and subjecting the semi-finished product to a temperature of 50° C.~180° C., in order for the semi-finished product to undergo a reaction for a reaction time of 10~120 seconds and consequently form the TPU membrane with high adhesion and high elasticity.

In one embodiment, the modifying solution is a mixture of diethylenetriamine, diethylaminopropylamine, and diaminodiphenylmethane in a weight ratio of 30%~50%: 30%~50%:10%~30%.

In one embodiment, the modifying solution is a mixture of diethylenetriamine, diethylaminopropylamine, and diaminodiphenylmethane in a weight ratio of 40%:40%: 20%.

In one embodiment, the TPU membrane has a thickness of 50 μm~1 mm.

In one embodiment, the TPU membrane has an upper surface and a lower surface, and the modifying solution is applied on the upper surface, the lower surface, or both surfaces depending on the thickness of the TPU membrane.

In one embodiment, the semi-finished product is subjected to a temperature of 90° C.~120° C. in order to undergo the reaction.

In one embodiment, the reaction time of the semi-finished product is 120 seconds.

In one embodiment, the weight ratio of the modifying solution to the TPU membrane is 3%~5%.

In one embodiment, the modifying solution is added with a filler solution, and the filler solution is dimethyl ketone.

In one embodiment, the TPU membrane with high adhesion and high elasticity includes a plurality of layers of PU polymer chains and a plurality of modifying molecule chains. Each layer of PU polymer chains includes a plurality of hard segments and a plurality of soft segments. The modifying molecule chains are grafted to the hard segments respectively or are grafted between the hard segments and the soft segments respectively.

The techniques and means adopted by the present invention to achieve the aforesaid objective and the effects of those techniques and means can be better understood by referring to the following detailed description in conjunction with the accompanying drawings. The detailed description and the drawings are also expected to enable better comprehension of the objective, characteristics, and features of the invention. The drawings, however, serve explicatory purposes only and are not intended to be restrictive of the scope of the invention.

DETAILED DESCRIPTION OF THE INVENTION

Figure 1:
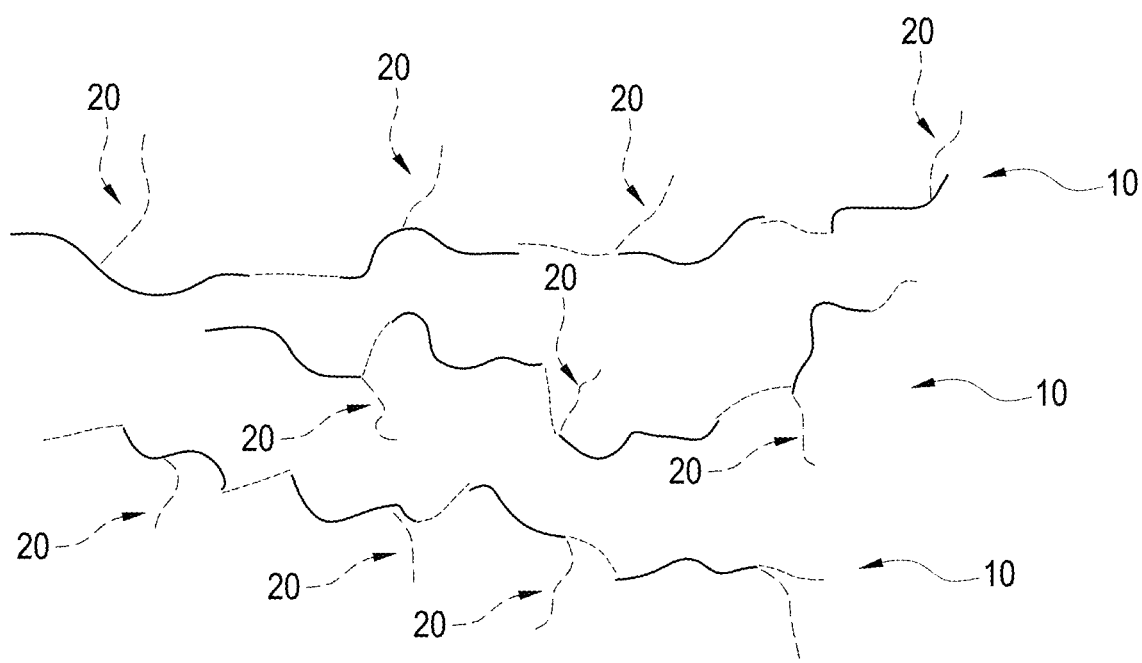
FIG. 1 is a schematic drawing of the structure of a TPU membrane with high adhesion and high elasticity according to the present invention.

A detailed description of the technical content of the present invention is given below with reference to the accompanying drawings.

The present invention provides a method of preparing a TPU membrane with high adhesion and high elasticity. The method includes the steps of: (a) preparing a modifying solution, wherein the modifying solution is one or a mixture of at least two of diethylenetriamine (DETA), diethylaminopropylamine (DEAP), and diaminodiphenylmethane (DAPM); (b) preparing a semi-finished product of the TPU membrane with high adhesion and high elasticity by applying the modifying solution on at least one surface of a TPU membrane; and (c) subjecting the semi-finished product to a temperature of 50° C.~180° C., in order for the semi-finished product to undergo a reaction for a reaction time of 10~120 seconds and thus form the TPU membrane with high adhesion and high elasticity.

In step (a), the modifying solution is prepared by mixing DETA (0%~100% by weight), DEAP (0%~100% by weight), and DAPM (0%~100% by weight) together. That is to say, the modifying solution may contain only DETA, only DEAP, only DAPM, or a mixture of the above. When the modifying solution is so prepared that the DETA:DEAP:DAPM weight ratio is 30%~50%:30%~50%:10%~30%, the end product (i.e., the TPU membrane with high adhesion and high elasticity) has remarkably high adhesion and elasticity. When the DETA:DEAP:DAPM weight ratio is 40%:40%:20%, the end product has the optimal adhesion and elasticity. Step (a) may further include adding a filler solution to the modifying solution. For example, the filler solution is dimethyl ketone (also known as acetone), which not only can be used as a filler but also is inexpensive. By mixing acetone into the modifying solution, the preparation cost of the end product can be reduced to a great extent, although the adhesion and elasticity of the end product will be lowered too. Now that the addition of the filler solution compromises the adhesion and elasticity of the end product, the percentage of the filler solution should not be too high. To effect significant cost reduction, the weight ratio of the modifying solution to the filler solution is preferably 60%~80%:20%~40%, and more preferably 70%:30%.

In step (b), the weight ratio of the modifying solution to the TPU membrane is 0.1%~10%. If the weight ratio of the modifying solution to the TPU membrane is too low (e.g., lower than 0.1%), the extent of chemical reaction may be so small that the end product functions as an unmodified TPU membrane, i.e., exhibiting substantially the same adhesion and elasticity as an unmodified TPU membrane. If, however, the weight ratio of the modifying solution to the TPU membrane is too high (e.g., higher than 10%), the extent of reaction in the TPU membrane may be so large that the TPU membrane is decomposed by the modifying solution, meaning the TPU membrane may break as easily as toilet tissues and hence cannot be adhesively attached to a textile fabric. To achieve a satisfactory yield of the end product, therefore, the weight ratio of the modifying solution to the TPU membrane is preferably 3%~5%.

The TPU membrane may be any commercially available TPU membrane. The end product will have high utility value if the TPU membrane has a thickness of 50 μm~1 mm. As suitable TPU membranes come in a wide range of thicknesses, applying the modifying solution on only one surface of a relatively thick TPU membrane may result in insufficient dispersion and hence a smaller extent of reaction than intended. In order for TPU membranes whose thicknesses are of the order of μm to mm to have a satisfactory reaction rate, the modifying solution should be applied on both upper and lower surfaces of such membranes. When the thickness of a TPU membrane is of the order of nm to μm, however, applying the modifying solution on the upper or lower surface of the membrane suffices for a desirable reaction rate.

In step (c), the reaction temperature of the semi-finished product is set at 90° C.~120° C. to cater for the potentially divergent properties of different TPU membranes (some common examples of which are those made of diisocyanate or polyurea) and to achieve a high product yield. Moreover, too short a reaction time may lead to an exceedingly low reaction rate, and too long a reaction time may cause crystallization of the TPU membrane. In the latter case, the crystals will lower the adhesiveness of the end product, and when a plethora of crystals are formed, the end product will have problem being adhered to a textile. A reaction time of 120 seconds allows the modifying solution to react sufficiently with the TPU membrane without forming crystals. It is therefore preferable that the reaction time of the semi-finished product is 120 seconds.

It is worth mentioning that, according to one embodiment of the present invention, the preparation of a TPU membrane with high adhesion and high elasticity involves the use of a blade coater by way of example. More specifically, the coating module of the blade coater applies the modifying solution on the upper or lower surface of a TPU membrane transported by a conveyor belt, and any excess modifying solution applied will be scraped off by a blade. The resulting semi-finished product is subjected to an appropriate temperature for reaction until the end product is obtained, wherein the temperature is provided by a module such as but not limited to an ultraviolet lamp.

FIG. 1 schematically shows the structure of a TPU membrane with high adhesion and high elasticity according to the present invention, as observed with a scanning electron microscope (SEM). The TPU membrane with high adhesion and high elasticity includes a plurality of layers of PU polymer chains 10 and a plurality of modifying molecule chains 20. Each layer of PU polymer chains 10 includes a plurality of hard segments (represented by the solid line segments) and a plurality of soft segments (represented by the dashed line segments), wherein the hard segments and the soft segments are alternately arranged and are connected in series to form the layer of PU polymer chains 10. The modifying molecule chains 20 are grafted to the hard segments respectively or are grafted to the junctions between the hard segments and the soft segments respectively, thereby enabling the TPU membrane to cover the target fibers (i.e., the fibers to which the TPU membrane is attached) completely. When the TPU membrane with high adhesion and high elasticity is adhesively attached to a textile, the modifying molecule chains 20 provide strong adhesion between the TPU membrane and the textile as well as enhanced elasticity so that the TPU membrane will hold fast to, and will not easily detach from, the textile.

Embodiment 1

Figure 2A:
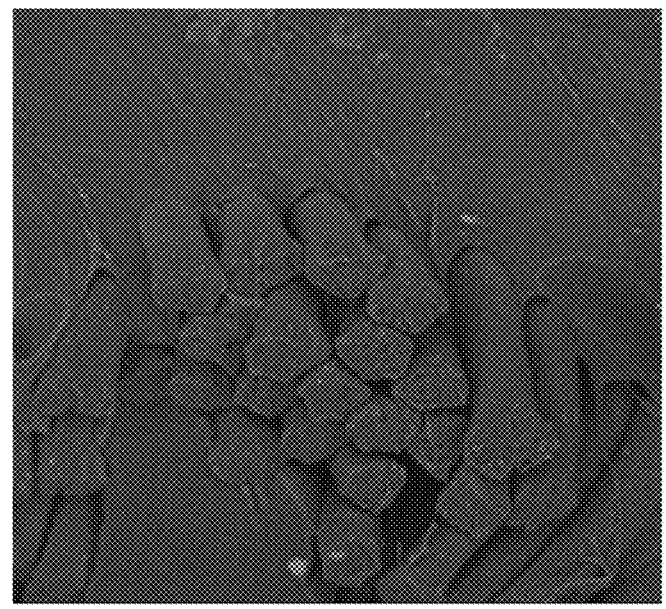
FIG. 2A is a scanning electron microscope image showing the structure of a TPU membrane with high adhesion and high elasticity according to the invention.
Figure 2B:
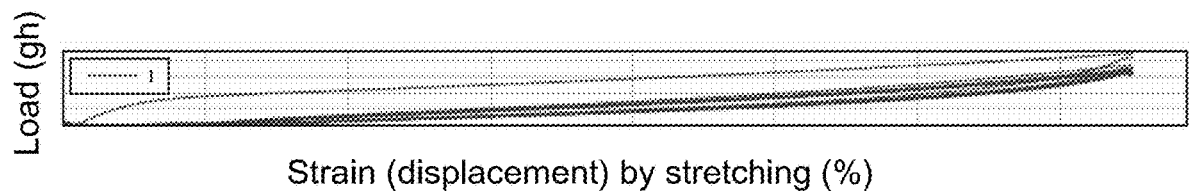
FIG. 2B is a graph showing the elastic recovery test result of a TPU membrane with high adhesion and high elasticity according to the invention.
Figure 2C:
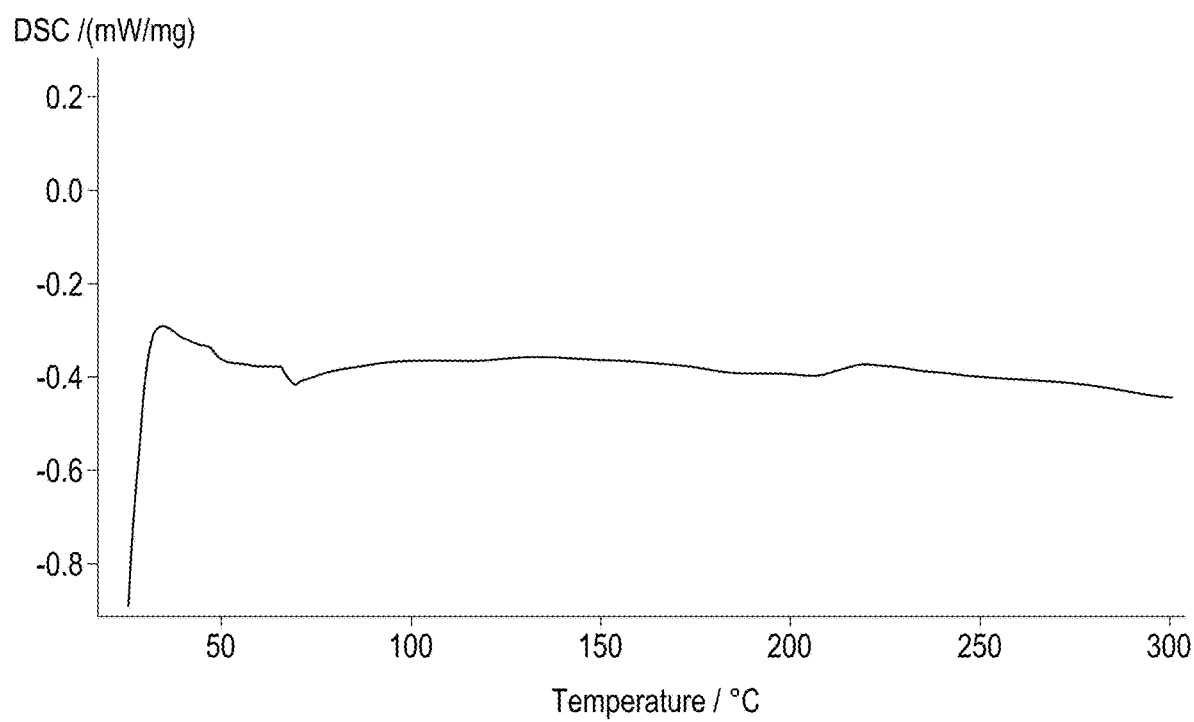
FIG. 2C is a graph showing the differential scanning calorimetry analysis result of a TPU membrane with high adhesion and high elasticity according to the invention.
Figure 2D:
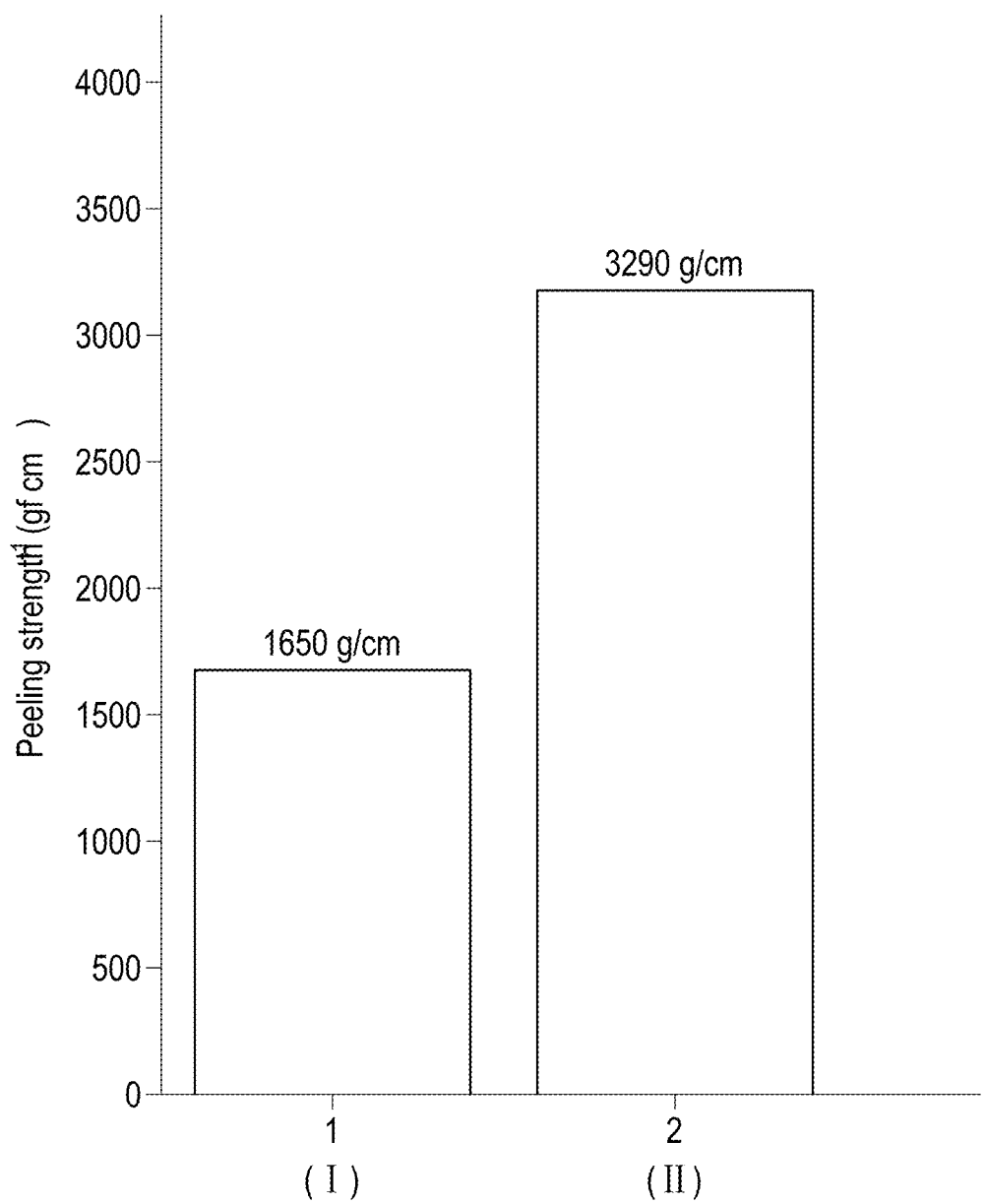
FIG. 2D is a graph showing the peeling strength test result of a TPU membrane with high adhesion and high elasticity according to the invention.

The modifying solution was prepared by mixing DETA, DEAP, and DAPM together in a weight ratio of 40%:40%:20%. Then, a semi-finished product was prepared by applying the modifying solution over the upper surface of a 50 μm-thick TPU membrane, wherein the weight ratio of the modifying solution to the TPU membrane is 5%. The semi-finished product was then subjected to a temperature of 120° C. for reaction, which lasted 120 seconds, and a TPU membrane with high adhesion and high elasticity was obtained as a result. FIG. 2A provides an SEM image showing the structure of the end product. The image also shows that the end product covered the target fibers completely. An elastic recovery test was performed on a sample strip of the end product according to British Standard EN 14704-1, and the test result (see FIG. 2B) shows 100% elastic recovery after five cycles of 75% elongation (under load) and release. Referring to FIG. 2C for the differential scanning calorimetry (DSC) analysis result of the end product, the low melting temperature peak has a small peak area, and so does the high melting temperature peak. The peeling strength of the end product was tested by the method specified in ISO 2411, and according to the test result shown in FIG. 2D, the peeling strength of the end product (II) was twice as high as that of a conventional TPU membrane (I).

Embodiment 2

The modifying solution was prepared by mixing DETA, DEAP, and DAPM together in a weight ratio of 30%:50%:20%. Then, the modifying solution and a filler solution (acetone) were thoroughly mixed in a weight ratio of 70%:30%. The mixture of the modifying solution and the filler solution was applied over the lower surface of a 1 μm-thick TPU membrane to produce a semi-finished product, wherein the weight ratio of the modifying solution to the TPU membrane was 3%. The semi-finished product was then subjected to a temperature of 90° C. for reaction, which lasted 60 seconds.

Embodiment 3

The modifying solution was prepared by mixing DETA, DEAP, and DAPM together in a weight ratio of 50%:40%:10%. Then, the modifying solution and a filler solution (acetone) were thoroughly mixed in a weight ratio of 80%:20%. The mixture of the modifying solution and the filler solution was applied over the upper surface and lower surface of a 1 mm-thick TPU membrane to produce a semi-finished product, wherein the weight ratio of the modifying solution to the TPU membrane was 10%. The semi-finished product was then subjected to a temperature of 180° C. for reaction, which lasted 10 seconds.

Embodiment 4

The modifying solution was prepared by mixing DETA, DEAP, and DAPM together in a weight ratio of 40%:30%:30%. Then, the modifying solution and a filler solution (acetone) were thoroughly mixed in a weight ratio of 60%:40%. The mixture of the modifying solution and the filler solution was applied over the upper surface and lower surface of a 50 μm-thick TPU membrane to produce a semi-finished product, wherein the weight ratio of the modifying solution to the TPU membrane was 0.1%. The semi-finished product was then subjected to a temperature of 50° C. for reaction, which lasted 90 seconds.

Embodiment 5

The modifying solution was prepared from DETA, DEAP, and DAPM in a weight ratio of 100%:0%:0%, and the remaining steps were the same as in embodiment 1.

Embodiment 6

The modifying solution was prepared from DETA, DEAP, and DAPM in a weight ratio of 0%:100%:0%, and the remaining steps were the same as in embodiment 2.

Embodiment 7

The modifying solution was prepared from DETA, DEAP, and DAPM in a weight ratio of 0%:0%:100%, and the remaining steps were the same as in embodiment 3.

The elastic recovery test results (load=2000 gf) and peeling strength test results of the end products of embodiments 2~7 and of a conventional TPU membrane are tabulated as follows:

|  | Elastic recovery (%) | Peeling strength (g/cm) |
|---|---|---|
| Embodiment 2 | 99 | 2970 |
| Embodiment 3 | 99 | 2815 |
| Embodiment 4 | 98 | 2680 |
| Embodiment 5 | 100 | 3310 |
| Embodiment 6 | 100 | 3085 |
| Embodiment 7 | 100 | 3176 |
| Conventional TPU membrane | 98 | 1650 |

To sum up, the embodiments of the present invention have the following advantages and effects:

1. The major effect of the invention is a significant increase in the adhesion and elasticity of a TPU membrane and is achieved by modifying the surface(s) of the TPU membrane with a modifying solution;

2. The modifying solution of the invention can be mixed with a filler solution as desired, thereby lowering the production cost of a TPU membrane with high adhesion and high elasticity; and 3. As the modifying molecule chains in the invention are grafted respectively to the hard segments of the PU polymer chains or to the junctions between the hard segments and soft segments of the PU polymer chains, the resulting TPU membrane can cover the fibers it is attached to in their entirety.

It should be understood that the embodiments described above and shown in the accompanying drawings are only some preferred ones of the present invention and are not intended to be restrictive of the features or scope of the invention. The scope of the invention is defined by the appended claims and encompasses all the embodiments based on the spirit of the claims (or on similar variations thereof) and any change or modification that is easily conceivable by a person skilled in the art.

What is claimed is:

1. A method of preparing a thermoplastic polyurethane (TPU) membrane, comprising the steps of:
    preparing a modifying solution, wherein the modifying solution is a mixture of diethylenetriamine, diethylaminopropylamine, and diaminodiphenylmethane;
    preparing a semi-finished product by applying the modifying solution on at least one surface of a TPU membrane, wherein the modifying solution and the TPU membrane are in a weight ratio of 0.1%-10%; and
    subjecting the semi-finished product to a temperature of 50° C.-~180° C., in order for the semi-finished product to undergo a reaction for a reaction time of 10-120 seconds and thus form the TPU membrane.

2. The method of preparing the TPU membrane as claimed in claim 1, wherein the modifying solution is a mixture of diethylenetriamine, diethylaminopropylamine, and diaminodiphenylmethane in a weight ratio of 40%:40%:20%.

3. The method of preparing the TPU membrane as claimed in claim 1, wherein the TPU membrane has a thickness of 50 μm~1 mm.

4. The method of preparing the TPU membrane as claimed in claim 3, wherein the TPU membrane has an upper surface and a lower surface, and the modifying solution is applied on one or both of the upper surface and the lower surface depending on the thickness of the TPU membrane.

5. The method of preparing the TPU membrane as claimed in claim 1, wherein the semi-finished product is subjected to a temperature of 90° C.~120° C. in order to undergo the reaction.

6. The method of preparing the TPU membrane as claimed in claim 1, wherein the reaction time of the semi-finished product is 120 seconds.

7. The method of preparing the TPU membrane as claimed in claim 1, wherein the modifying solution and the TPU membrane are in a weight ratio of 3%~5%.

8. The method of preparing the TPU membrane as claimed in claim 1, further comprising adding a filler solution to the modifying solution, wherein the filler solution is dimethyl ketone.

9. The method of preparing the TPU membrane as claimed in claim 1, wherein the TPU membrane comprises a plurality of layers of polyurethane (PU) polymer chains and a plurality of modifying molecule chains, each said layer of PU polymer chains comprises a plurality of hard segments and a plurality of soft segments, and the modifying molecule chains are grafted to the hard segments respectively or are grafted between the hard segments and the soft segments respectively.

\* \* \* \* \*